United States Patent [19]

Ernst et al.

[11] 4,130,286

[45] Dec. 19, 1978

[54] PACKING MEANS FOR SHAFT BUSHINGS

[75] Inventors: Horst M. Ernst, Eltingshausen; Manfred Brandenstein, Aschfeld; Armin Olschewski, Schweinfurt, all of Germany

[73] Assignee: SKF Industrial Trading and Development Company B.V., Amsterdam, Netherlands

[21] Appl. No.: 851,985

[22] Filed: Nov. 16, 1977

Related U.S. Application Data

[63] Continuation of Ser. No. 513,085, Oct. 8, 1974, abandoned.

[30] Foreign Application Priority Data

Oct. 23, 1973 [DE] Fed. Rep. of Germany ... 7338017[U]

[51] Int. Cl.² .................... F16C 19/00; F16J 15/32
[52] U.S. Cl. .................................. 277/12; 277/166; 277/183; 277/186; 277/189; 308/6 C; 308/187.2; 308/216
[58] Field of Search ............... 277/166, 181, 184, 186, 277/188 R, 189, 215, 124, 167.3, 182, 183, 185.12, 198, 199, 212 R, 212 F, DIG. 4; 308/187.1, 216, 6 C, 36.1, 187.2; 46/17; 29/148.4 S

[56] References Cited

U.S. PATENT DOCUMENTS

| 2,183,004 | 12/1939 | Boyd | 277/184 |
| 2,768,036 | 10/1956 | Greenhough | 277/199 |
| 2,896,986 | 7/1959 | Sampo | 277/199 |
| 3,070,405 | 12/1962 | Hulck et al. | 308/6 C |
| 3,479,100 | 11/1969 | Pitner | 277/183 X |
| 3,486,268 | 12/1969 | Fischer | 47/17 X |
| 3,510,182 | 5/1970 | Cowles | 277/184 X |
| 3,531,134 | 9/1970 | Kammeraad | 277/189 X |
| 3,545,826 | 12/1970 | Magee et al. | 308/6 C |
| 3,719,979 | 3/1973 | Irwin | 308/6 C X |
| 3,881,787 | 5/1975 | Nilsson | 308/6 C |

FOREIGN PATENT DOCUMENTS 1167124  4/1964  Fed. Rep. of Germany .......... 308/6 C Primary Examiner—Robert S. Ward, Jr.

[57] ABSTRACT

A bushing for journalling a shaft having a cage for retaining a plurality of bearing balls and an annular packing for sealing the space between one end of the cage and the shaft. The packing and the cage are formed with cooperating axial projections and recesses which form interengagements for securing the packing on the end of the cage.

11 Claims, 4 Drawing Figures

PACKING MEANS FOR SHAFT BUSHINGS

This is a continuation application of Ser. No. 513,085, filed Oct. 8, 1974, now abandoned.

BACKGROUND OF THE INVENTION

The present invention relates to ball bushings for rotatable or oscillating shafts and in particular to a ball bushing provided with an elastic packing seal for closing the annular space between the shaft and the bushing.

Ball bushings are generally sealed with respect to the journalled shaft by suitable packing materials so that the penetration of alien bodies such as dirt, dust is prevented and the emergence of lubricant from between the bushing and the shaft is also prevented. It is desirable to integrate such packings with the bushing so as to provide a unitary assembly for both storage and installation. In the known designs there is however a drawback which lies in the fact that when the packing or bushing itself is damaged or destroyed, the packing can only be removed and replaced with the greatest of difficulty.

In German patent publication No. 7,238,681 an attempt to overcome the foregoing drawback was made. A housing was provided for the bushing having at its end an annular bulge over which the packing, provided with a cooperating axial lug, was snapped. However, the dimensions of such a design were very large and the attachment of the packing was neither stable or reliable. At very low axial loads, placed upon the packing, the packing was easily dislodged from its seat on the bushing.

It is an object of the present invention to provide a ball bushing with an integrated packing which overcomes the drawbacks of the prior art.

It is another object of the present invention to provide a ball bushing having an integrated packing which is reliable and stable under all conditions of use.

It is still another object of the present invention to provide a ball bushing having an integrated packing which is easily removable and exchangeable.

The foregoing objects, other objects, together with numerous advantages of the present invention will be seen from the following disclosure thereof.

SUMMARY OF THE INVENTION

According to the present invention a ball bushing for journalling shafts is provided comprising an annular cage adapted to retain a plurality of balls and an annular packing adapted to seal the space between one end of the bushing and the shaft. The packing and the cage are formed with axially directed and cooperating projecting members and recesses which interengage and secure the packing to the cage.

Preferably, the packing is made of resilient elastic material and includes a plurality of axially extending fingers which are adapted to positively snap within holes or recesses formed at the end of the cage. The recesses may be slots formed axially about the inner peripheral surface of the cage or, holes running axially from the end of the cage between its inner and outer surfaces. In either event, the packing and the cage can be provided with transverse projections and indentations or recesses respectively, which provide a positive engagement.

The bushing according to the present invention has the advantage that the overall radius of the packing need not exceed that of the bushing cage nor does the axial dimension of the packing have to be enlarged to accommodate any attachment means. Therefore the size of the bushing and the packing can be made smaller than any of the known designs. In that embodiment wherein the recesses are formed on the inner surface of the cage, the packing is securely held during operation by the shaft as well as the cooperating projections, since the shaft exerts a radial compression on the packing.

Full details of the present invention are given in the following description and are shown in the accompanying drawings.

DESCRIPTION OF THE INVENTION

Figure 1:
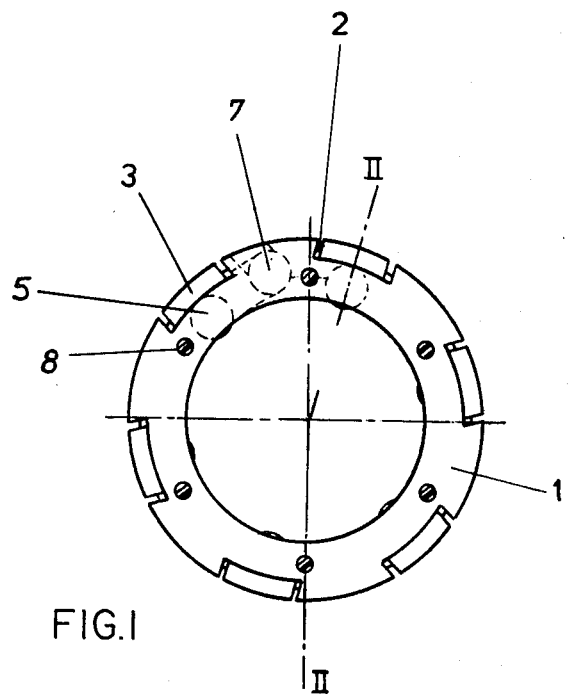
FIG. 1 is a sectional view taken along line 1—1 of FIG. 2 showing a bushing embodying the present invention.

The bushing, schematically shown in FIG. 1, comprises a substantially hard, rigid plastic cage, generally depicted by the numeral 1, on the outer peripheral surface of which are cut a plurality of axial slots 2 each of which is adapted to covered by a sheet metal supporting race 3. The races 3 may be joined to an annular collar or integrally formed with each other in some other manner so as to unitarily fit over the cage 1. A plurality of balls 4 are inserted in a series of axial guide bores 5 and 7. The guide bore 5 is adapted to lie beneath the race 3 and to be open radially inward to allow the balls to engage with the surface of a shaft 6 journalled within the bushing. The bore 7 is connected to its associated bore 5 but is radially offset so as to receive the balls when they are not in engagement with the shaft 6. The balls 4 are thus adapted to circulate between the bore 5 and the bore 7 which may respectively be referred to as the stressed and unstressed bearing zones. The bushing is adapted to be inserted in a suitable block or housing wherein it is fixed and wherein the outer supporting races 3 are secured.

Figure 2:
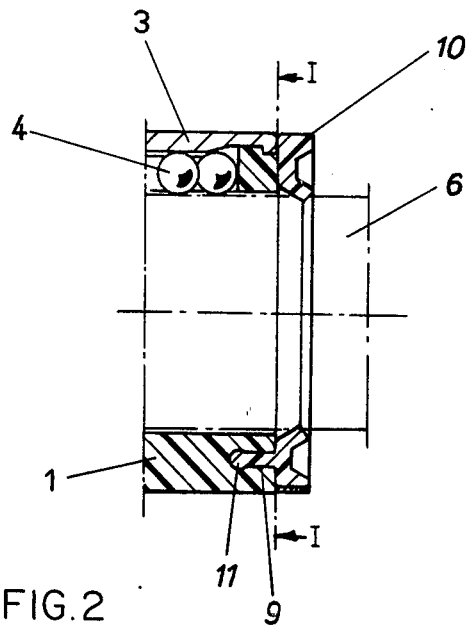
FIG. 2 is an axial section of the bushing shown in FIG. 1, taken along line 2—2 of FIG. 1.

In the embodiment seen in FIGS. 1 and 2 the frontal end of the cage 1 is provided with a plurality of recesses in the form of axial holes 8 drilled between the stress bore zone 5 and the unstressed bore zone 7 associated with each of the adjacent races 3. An annular packing made of resiliently elastic material such as plastic, rubber or the like, generally depicted by the numeral 10 is provided with a flat face which is set against the front end of the cage 1. The packing 10 is provided with a plurality of axially extending members in the form of fingers 9, which conform to the holes 8 and which are circumferentially spaced accordingly. The fingers 9 are adapted to be inserted within the holes 8 and to cooperate therewith to provide a secure engagement of the packing and the cage. To further insure engagement and interlocking under general operating conditions, the hole 8 and the fingers 9 are spherically shaped, as seen by the numeral 11, so that a positive snapping interaction is obtained. Preferably the fingers 9 are slightly larger than the holes 8 to provide a secure force fit. The packing ring may be further fashioned so as to provide an enlarged part which fits into the opening of the bores 5 and 7 wherein the balls are inserted, as seen in the upper part of FIG. 2. The sheet metal race 3 and the adjacent portion of the packing ring 10 may be provided respectively with a detent or radially inward flange and a peripheral slot for interengagement. As a result the end of the sheet metal race 3 may be held resiliently in a spring-like fashion over the outer peripheral surface of the packing 10.

The packing ring 10 has an inner lip which is of smaller diameter than that of the inner diameter of the cage. This lip extends radially inwardly to positively engage over the surface of the shaft 6, which is inserted within the bushing. The outer diameter of the packing is however preferably equal to that of the cage and race cover. Preferably, the recesses and the axially extending projections are uniformly distributed about the circumference of the packing and the cage to obtain symmetry and balance as well as ease of assembly. Because the packing is made of resiliently elastic material, it may be easily removed from the cage should it become worn or damaged. The axial direction of the projecting fingers and the holes in the cage permits easy installation and even removal under all conditions even when the bushing is actually installed in use. The positive interengagement of the packing and cage permits assembly of the bushing as a complete unit, during manufacture so that storage, transportation and later installation is facilitated. It will also be seen that the overall dimensions of the packing is no greater than that of the bushing itself and therefore a savings in space and material used is obtained.

Figure 3:
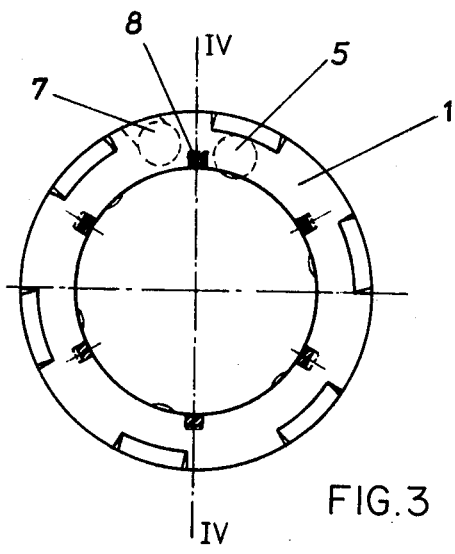
FIG. 3 is a view similar to that of FIG. 1 showing a modified bushing according to the present invention, and taken along lines 3—3 of FIG. 4.
Figure 4:
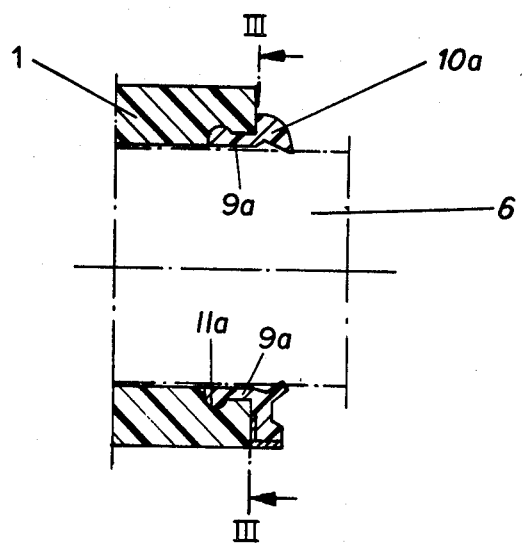
FIG. 4 is a sectional view taken along line 4—4 of FIG. 3.

The modification, seen in FIGS. 3 and 4, is generally similar to that shown in FIG. 1. The cage 1 and race 3 as well as balls 4 being similarly arranged in this embodiment as in the earlier embodiment. In the form shown in FIGS. 3 and 4, the cooperating axially extending projections and recesses are somewhat differently formed. Here slots 8a are cut axially inward on the inner surface of the cage 1 from one frontal end. The slots 8a lie between the ball bore zones 5 and 7 of the associated races 3 as in the preceding embodiment so as not to interfere with the movement of the balls. The packing 10a is similarly modified so that, in addition to the flat frontal face adapted to seat against the end of the cage, the packing ring is provided with axially extending projections 9a lying coextensive with the inner surface and adapted to force fit within the slots 8a. Each extension member 9a and its associated slot 8a terminate in a cooperating semi-spherical end 11a which provides a positive interengagement. The spherical ends 11a are directed radially outward and are thus forced into absolute engagement by the location of the shaft 6 within the cage, which shaft forces the compression of the projections 9a within the slots 8a.

The outer edge of the packing ring is formed with a resilient lip having a radially inwardly directed edge adapted to positively engage the surface of the shaft. The form of the outer edge of the packing ring may be that of the shape generally seen in FIGS. 1 and 2. The shape is seen in the lower portion of FIG. 4. However, since the ring is more positively held by the shaft 6, during use, the outer diameter may if desired be less than that of the cage 1, as seen in the top portion of FIG. 4.

It will be apparent that the exact form of the cooperating extensions and recesses may be varied. In particular in the embodiment of FIG. 4 the projections 9a and the conforming slots 8a may be annular in nature. Further, the shape of the holes 8 and the fingers 9 may vary and their arrangements may be changed in many ways without change in the concept of the present invention. It will be obvious that the advantages and objects enumerated in the introduction to this disclosure have in fact been obtained and that a positively interconnected packing and cage is provided with the use of optimal amounts of material and space and without unnecessarily enlarging either the cost or the dimensional constructions of the device. It is intended therefore that the present disclosure be taken as illustrative only and not limiting of the present invention.

What is claimed is:

1. A ball bushing for journalling a shaft comprising an annular cage having ball-receiving bores therein, balls within said bores and race means retaining said balls within said cage, and a resilient packing releasably secured to the frontal end of said cage for sealing the space between the shaft and the frontal end of the cage, said packing being formed with an annular body adapted to engage the shaft and connecting means projecting axially from said body and extending circumferentially thereabout, said cage being formed with axial recess means cooperable with and dimensioned to receive the connecting means on said packing body, said connecting means and recesses being provided with cooperable extensions thereof extending transverse to the central axis of said packing to removably interlock said packing and cage together on stressing of said packing about said shaft, said race means and packing being cooperable to resiliently retain the end of said race means and said packing in interengaging relationship.

2. A ball bushing according to claim 1, wherein said connecting means of said packing body comprise a plurality of circumferentially spaced fingers and said recesses comprise a plurality of circumferentially spaced apertures extending axially inwardly from the frontal end of said cage.

3. A ball bushing according to claim 2, wherein said ball-receiving bores comprise a series of sets of first and second radially offset bores, the first and second bores of each set being connected.

4. A ball bushing according to claim 3, wherein said axially extending apertures are located respectively between said sets of first and second bores.

5. A ball bushing according to claim 1, wherein said recesses are formed on the inner radial surface of said cage.

6. A ball bushing according to claim 1, wherein said packing is made of resilient material and said cage is made of rigid material.

7. A ball bushing according to claim 1, wherein said packing comprises an annular member having inner and outer diameters substantially equal to that of said cage.

8. A ball bushing according to claim 1, wherein said packing includes an annular lip extending radially inwardly for engagement with the peripheral surface of said shaft.

9. A ball bushing according to claim 1, wherein said race means and the cooperable portion of said packing are provided respectively with a radially inward flange and a peripheral slot.

10. A ball bushing according to claim 3, wherein said cage is provided on the outer peripheral surface thereof with a plurality of axial slots overlying corresponding ones of said first bores, said race means comprising a plurality of supporting races positioned respectively in said axial slots and retaining the balls in said first bores.

11. A ball bushing according to claim 3, wherein said packing is provided with a series of enlarged portions dimensioned to fit within said first and second bores.

* * * * *